United States Patent
Nakano et al.

(10) Patent No.: US 7,054,502 B2
(45) Date of Patent: May 30, 2006

(54) IMAGE RESTORATION APPARATUS BY THE ITERATION METHOD

(75) Inventors: Yuusuke Nakano, Akashi (JP); Hironori Sumitomo, Moriguchi (JP)

(73) Assignee: Minolta Co., Ltd., Osaka (JP)

( * ) Notice: Subject to any disclaimer, the term of this patent is extended or adjusted under 35 U.S.C. 154(b) by 853 days.

(21) Appl. No.: 10/104,500

(22) Filed: Mar. 22, 2002

(65) Prior Publication Data

US 2002/0167597 A1 Nov. 14, 2002

(30) Foreign Application Priority Data

Mar. 30, 2001 (JP) .............................. 2001-098158

(51) Int. Cl.
*G06K 9/40* (2006.01)
*H04N 9/73* (2006.01)

(52) U.S. Cl. ................................. 382/275; 348/223.1

(58) Field of Classification Search ................ 382/255, 382/268, 275, 305, 312, 254, 260, 261, 264; 348/345, 607, 208.4, 208.5, 222.1, 223.1; 355/52, 71

See application file for complete search history.

(56) References Cited

U.S. PATENT DOCUMENTS 6,154,574 A * 11/2000 Paik et al. .................. 382/255
6,229,578 B1 * 5/2001 Acharya et al. ............ 348/607
6,445,415 B1 * 9/2002 Olsson ....................... 348/345
6,636,645 B1 * 10/2003 Yu et al. ..................... 382/268
6,694,063 B1 * 2/2004 Kulhalli et al. ............ 382/275
6,788,826 B1 * 9/2004 Van de Velde et al. ..... 382/275

FOREIGN PATENT DOCUMENTS

JP 06-118468 A 4/1994

OTHER PUBLICATIONS

M. Elad et al., "Super-Resolution Restoration of An Image Sequence—Adaptive Filtering Approach", *Technion-Israel Institute of Technology*, Apr. 4, 1997, 24 pages.

* cited by examiner

Primary Examiner—Kanjibhai Patel
(74) Attorney, Agent, or Firm—Sidley Austin LLP

(57) ABSTRACT

The transposed filter of the image degrading filter is calculated, and a residual gradient image is calculated by the convolution operation of the transposed filter and a residual image obtained from the image degrading filter, the estimated restored image and the degraded image. Then, a modified image of the estimated image is calculated from the residual gradient image, and the estimated image is modified and updated based on the modified image. Consequently, even when the degradation function is one that can be expressed as a complicated helical filter, the memory consumption is small and the calculation time is short compared to a method depending on a large matrix and an inverse matrix.

8 Claims, 9 Drawing Sheets

Fig. 9

|  |  |  |  |  |  |  |
|---|---|---|---|---|---|---|
|  | Y1 | Y2 | Y3 | Y4 | Y5 |  |
|  | Y6 | Y7 | Y8 | Y9 | Y10 |  |
|  | Y11 | Y12 | Y13 | Y14 | Y15 |  |
|  | Y16 | Y17 | Y18 | Y19 | Y20 |  |
|  | Y21 | Y22 | Y23 | Y24 | Y25 |  |
|  |  |  |  |  |  |  |

Fig. 10

|  |  |  |  |  |  |  |
|---|---|---|---|---|---|---|
|  |  |  |  |  |  |  |
|  |  | Z1 | Z2 | Z3 |  |  |
|  |  | Z4 | Z5 | Z6 |  |  |
|  |  | Z7 | Z8 | Z9 |  |  |
|  |  |  |  |  |  |  |
|  |  |  |  |  |  |  |

Fig. 11

| A | B | C |
|---|---|---|
| D | E | F |
| G | H | I |

Fig. 12(A)

| I | H | G |
|---|---|---|
| F | E | D |
| C | B | A |

Fig. 12(B)

| 0 | 0 | 0 |
|---|---|---|
| 0 | E | D |
| 0 | B | A |

Fig. 12(C)

| 0 | 0 | 0 |
|---|---|---|
| 0 | 0 | 0 |
| 0 | 0 | A |

Fig. 13

$$H = \begin{bmatrix} A & B & C & & & \\ & A & B & C & & \\ & & A & B & C & \\ & & & A & B & C \\ & & & & A & B & C \end{bmatrix}$$

$$A = \begin{bmatrix} a & b & c & & & \\ & a & b & c & & \\ & & a & b & c & \\ & & & a & b & c \\ & & & & a & b & c \end{bmatrix} \quad B = \begin{bmatrix} d & e & f & & & \\ & d & e & f & & \\ & & d & e & f & \\ & & & d & e & f \\ & & & & d & e & f \end{bmatrix}$$

$$C = \begin{bmatrix} g & h & i & & & \\ & g & h & i & & \\ & & g & h & i & \\ & & & g & h & i \\ & & & & g & h & i \end{bmatrix}$$

Fig. 14

$$H^T = \begin{bmatrix} A^T & & & & & & \\ B^T & A^T & & & & & \\ C^T & B^T & A^T & & & & \\ & C^T & B & A^T & & & \\ & & C & B^T & A^T & & \\ & & & C^T & B^T & \\ & & & & C^T & \end{bmatrix}$$

Fig. 15

$$X = \begin{bmatrix} x_1 \\ x_2 \\ \bullet \\ \bullet \\ X_{49} \end{bmatrix}$$

Fig. 16

$$\frac{1}{1000} \cdot \begin{bmatrix}
0 & 0 & 0 & 0 & 0 & 0 & 0 & 0 & 0 & 0 & 0 & 0 & 0 & 0 & 0 & 0 & 13 & 0 & 0 \\
0 & 0 & 0 & 0 & 0 & 0 & 0 & 0 & 0 & 0 & 0 & 0 & 0 & 0 & 0 & 0 & 15 & 0 & 0 \\
0 & 0 & 0 & 0 & 0 & 0 & 0 & 0 & 0 & 0 & 29 & 26 & 22 & 0 & 0 & 0 & 15 & 0 & 0 \\
0 & 0 & 0 & 0 & 0 & 0 & 0 & 0 & 0 & 0 & 26 & 0 & 6 & 15 & 0 & 5 & 12 & 0 & 0 \\
0 & 0 & 0 & 0 & 0 & 0 & 0 & 0 & 0 & 0 & 26 & 3 & 0 & 17 & 8 & 16 & 0 & 0 & 0 \\
0 & 0 & 0 & 0 & 0 & 0 & 25 & 28 & 16 & 0 & 0 & 18 & 17 & 31 & 8 & 0 & 0 & 0 & 0 \\
0 & 0 & 0 & 0 & 0 & 0 & 26 & 0 & 22 & 0 & 0 & 0 & 3 & 14 & 0 & 0 & 0 & 0 & 0 \\
0 & 28 & 29 & 30 & 0 & 0 & 23 & 0 & 2 & 16 & 0 & 0 & 18 & 0 & 0 & 0 & 0 & 0 & 0 \\
0 & 22 & 0 & 21 & 0 & 0 & 10 & 19 & 19 & 3 & 12 & 17 & 2 & 0 & 0 & 0 & 0 & 0 & 0 \\
0 & 21 & 0 & 19 & 0 & 0 & 0 & 0 & 30 & 15 & 3 & 0 & 0 & 0 & 0 & 0 & 0 & 0 & 0 \\
0 & 6 & 20 & 20 & 0 & 0 & 3 & 18 & 3 & 0 & 0 & 0 & 0 & 0 & 0 & 0 & 0 & 0 & 0 \\
0 & 7 & 20 & 17 & 15 & 14 & 13 & 0 & 0 & 0 & 0 & 0 & 0 & 0 & 0 & 0 & 0 & 0 & 0 \\
15 & 8 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0
\end{bmatrix}$$

IMAGE RESTORATION APPARATUS BY THE ITERATION METHOD

This application is based on the application No. 2001-98158 filed in Japan, the content of which is hereby incorporated by reference.

BACKGROUND OF THE INVENTION

1. Field of the Invention

The present invention relates to an image restoration apparatus that obtains information on the degradation caused in an image shot by a digital camera or the like, that is, a degradation function, and estimates the pre-degradation image (restored image) from the degraded shot image by the iteration method.

2. Description of the Related Art

Conventionally, various techniques have been proposed to restore the degradation of an image obtained by use of an image sensing device typified by a CCD. Image degradation is that the actually obtained image is degraded compared to the ideal image to be obtained from the object to be shot. For example, an image obtained by use of a digital camera is degraded not only by aberrations depending on the aperture value, the focal length and the position of the focal point but also by a camera shake caused at the time of shooting.

On such a degraded image, restoration to approximate the obtained shot image to the ideal image by modeling image degradation has conventionally been performed.

When image restoration is performed, it is frequently performed to solve simultaneous linear equations regarding the image as a vector in which pixel values are vertically arranged in raster order and regarding the degradation function as a matrix. That is, when the image to be restored is X, the degradation matrix is H and the obtained image is Y, the relationship of the following expression (1) can be satisfied:

$$HX=Y \qquad (1)$$

Alternatively, considering the fact that the obtained image Y includes noise and the degradation matrix H normally includes an observational error or a discretization error, a minimal square solution the presence of which is insured is obtained by the following expression (2):

$$H^T HX=H^T Y \qquad (2)$$

where $H^T$ is the transposed matrix of the degradation matrix H. Generally, the degradation matrix H and the matrix $H^T H$ are both large and sparse matrices.

In the case of a simple degradation function such as a blur in one direction, the solution can be obtained by independently writing an equation with respect to the pixel array in the direction of the blur and directly calculating the inverse matrix of the matrix of the blur.

For example, Japanese Laid-open Patent Application H06-118468 proposes to make a blur in a slanting direction resolve itself into a problem of a blur in the horizontal or the vertical direction by adjusting the direction of the image arrangement so as to coincide with the direction of the blur. In doing this, this patent application also shows to obtain an inverse matrix such that continuity of differentiation is preserved in a boundary part of the restored image.

However, degradation functions caused by actual camera shakes include, for example, a degradation function represented by a complicated helical filter as shown in FIG. 16. This occurs when the exposure time is long and the shutter speed is low such as when a night view is shot. FIG. 16 shows information on an image degradation estimated to be caused under a shooting condition such that the focal length is 35 mm (converted to that of 35 mm film) and the shutter speed is ⅓ second which information is converted to a two-dimensional filter. Hereinafter, a filter that degrades the obtained image by image processing will be referred to as a degrading filter.

In the case of such a degradation function, it is not easy to obtain the inverse matrix of the large matrix H and $H^T H$, and generally, using the sparse configuration of the matrix, the iteration method is used. The principle of the image restoration by the iteration method is described, for example, in a document "M. Elad and A. Feuer; Super-Resolution of an Image Sequence-Adaptive Filtering Approach; Technion-Israel Institute of Technology, 4 Apr. 1997."

Examples of the iteration method include the Jacobi's method, the Gauss-Seidel method, the SOR (successive over-relaxation) method, the steepest-descent method and the CG (conjugate gradient) method.

However, in any of these methods, the memory consumption is large because the transposed matrix $H^T$ is referred to from the matrix H every iteration, and much time is spent for calculation.

The present invention is made to solve the above-mentioned problem, and an object thereof is to provide an image restoration apparatus capable of restoring a degraded image without obtaining the inverse matrix of the large matrix, and capable of reducing the memory consumption and the calculation time in the image restoration.

SUMMARY OF THE INVENTION

The above-mentioned object is attained by an image restoration apparatus comprising: a first image generator for generating a first image; a detector for detecting a degradation information of the first image; a filter generator for generating a degrading filter and a transposed filter of the degrading filter based on the detected degradation information; a second image generator for generating a second image by use of the first image and the degrading filter; a residual image calculator for calculating a residual image from the first image, the degrading filter and the second image; a gradient image calculator for calculating a gradient image of the residual image by a convolution operation of the transposed filter and the residual image; and a corrector for correcting the second image by use of the gradient image calculated by the gradient image calculator.

According to the present invention, the transposed filter of the degrading filter is generated, the gradient image is obtained by the convolution operation of the transposed filter and the residual image, and the image restoration is performed by use of the gradient image.

In the following description, like parts are designated by like reference numbers throughout the several drawings.

BRIEF DESCRIPTION OF THE DRAWINGS

FIG. 9 shows a degraded image area;

FIG. 10 shows a filled transposed filter area;

FIG. 11 shows a degrading filter h;

FIGS. 12(A) to 12(C) show transposed filters A to C, respectively;

FIG. 13 shows a matrix of the degrading filter;

FIG. 14 shows a transposed matrix of the degrading filter;

FIG. 15 shows the original image of FIG. 8 converted to a column vector; and FIG. 16 shows the degradation function like a helical filter.

DETAILED DESCRIPTION OF THE PREFERRED EMBODIMENT

Hereinafter, an embodiment of the present invention will be described with reference to the drawings.

Figure 1:
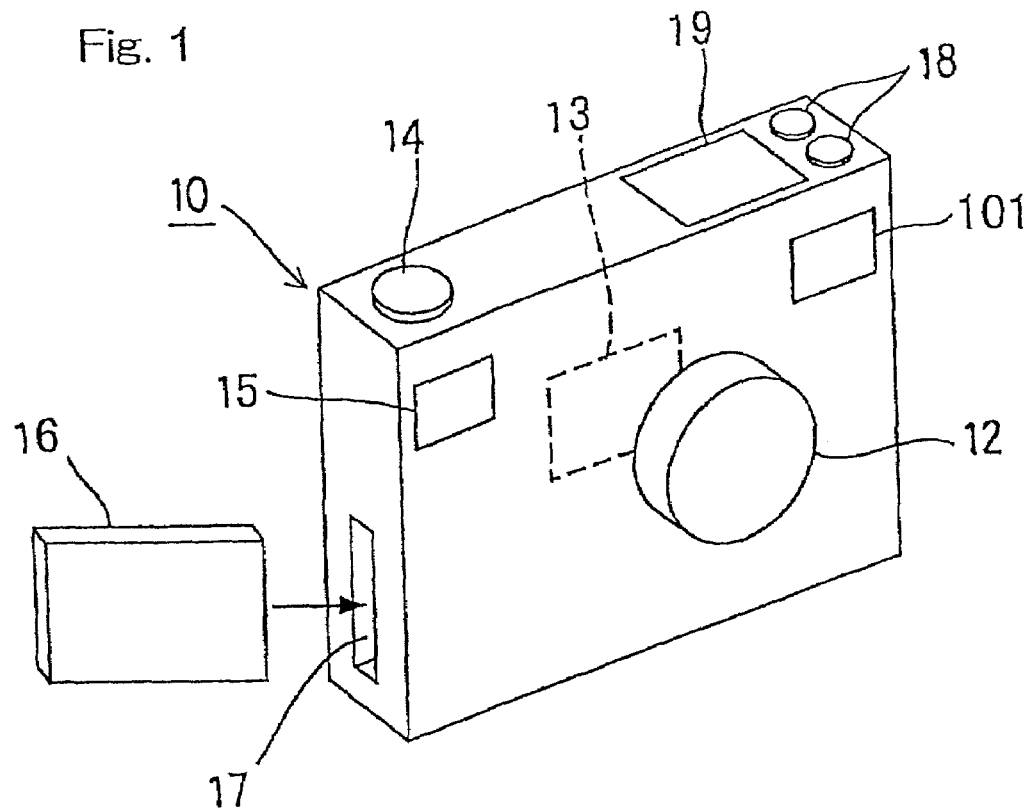
FIG. 1 is an external perspective view showing a digital camera to which an image restoration apparatus according to an embodiment of the present invention is applied.
Figure 2:
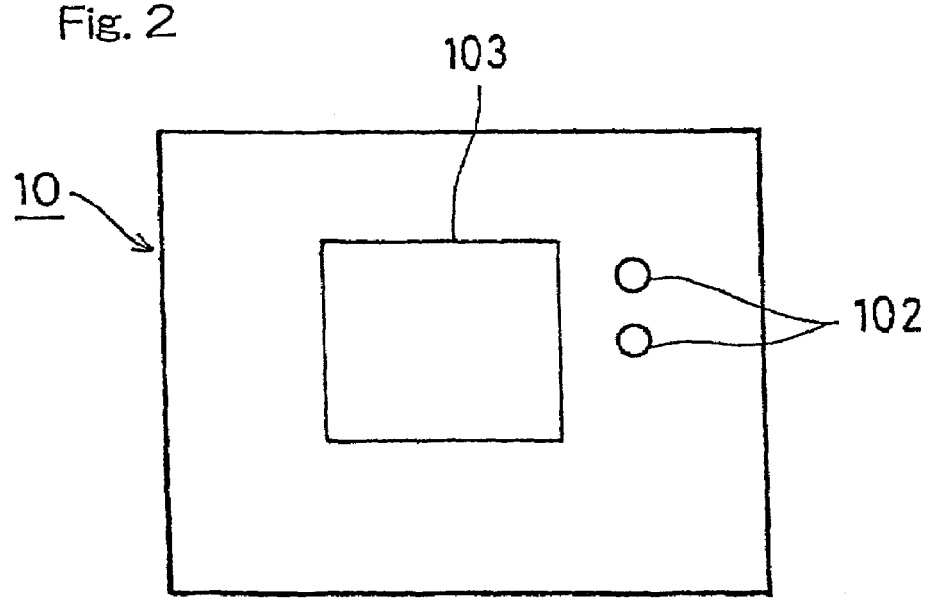
FIG. 2 is a rear view of the digital camera shown in FIG. 1.

FIG. 1 is an external perspective view showing a digital camera to which an image restoration apparatus according to the embodiment of the present invention is applied. FIG. 2 is a rear view of the digital camera.

In FIGS. 1 and 2, on the front surface of the digital camera 10, a photographing lens 12, a finder window 15 and a distance measurement window 101 are provided. In the digital camera 10, a CCD 13 is disposed as an example of an image sensing device that receives and photoelectrically converts an optical image formed by the photographing lens 12.

On the top surface of the digital camera 10, a release (shutter) button 14, shooting mode setting keys 18 and a liquid crystal panel 19 are provided. On a side surface of the digital camera 10, a slot 17 into which a recording medium 16 such as a memory card is detachably insertable is provided.

The shooting mode setting keys 18 are used for the user to perform setting of the exposure condition such as aperture priority or shutter priority, switching to or from macro shooting and zoom setting while viewing the contents displayed on the liquid crystal panel 19.

On the back surface of the digital camera 10, as shown in FIG. 2, a liquid crystal monitor 103 for live view display and image processing setting keys 102 are provided. The user can determine whether image restoration is necessary or not by the image processing setting keys 102 while viewing the liquid crystal monitor 103. Like normal digital cameras, the digital camera 10 is capable of recording images shot by the CCD 13 onto the recording medium 16. In addition thereto, the digital camera 10 has an image restoration function. This function is automatically performed by the digital camera 10 based on the obtained degradation function. It is to be noted that whether image restoration is necessary or not may be determined by the user by the image processing setting keys 102 before image restoration.

Figure 3:
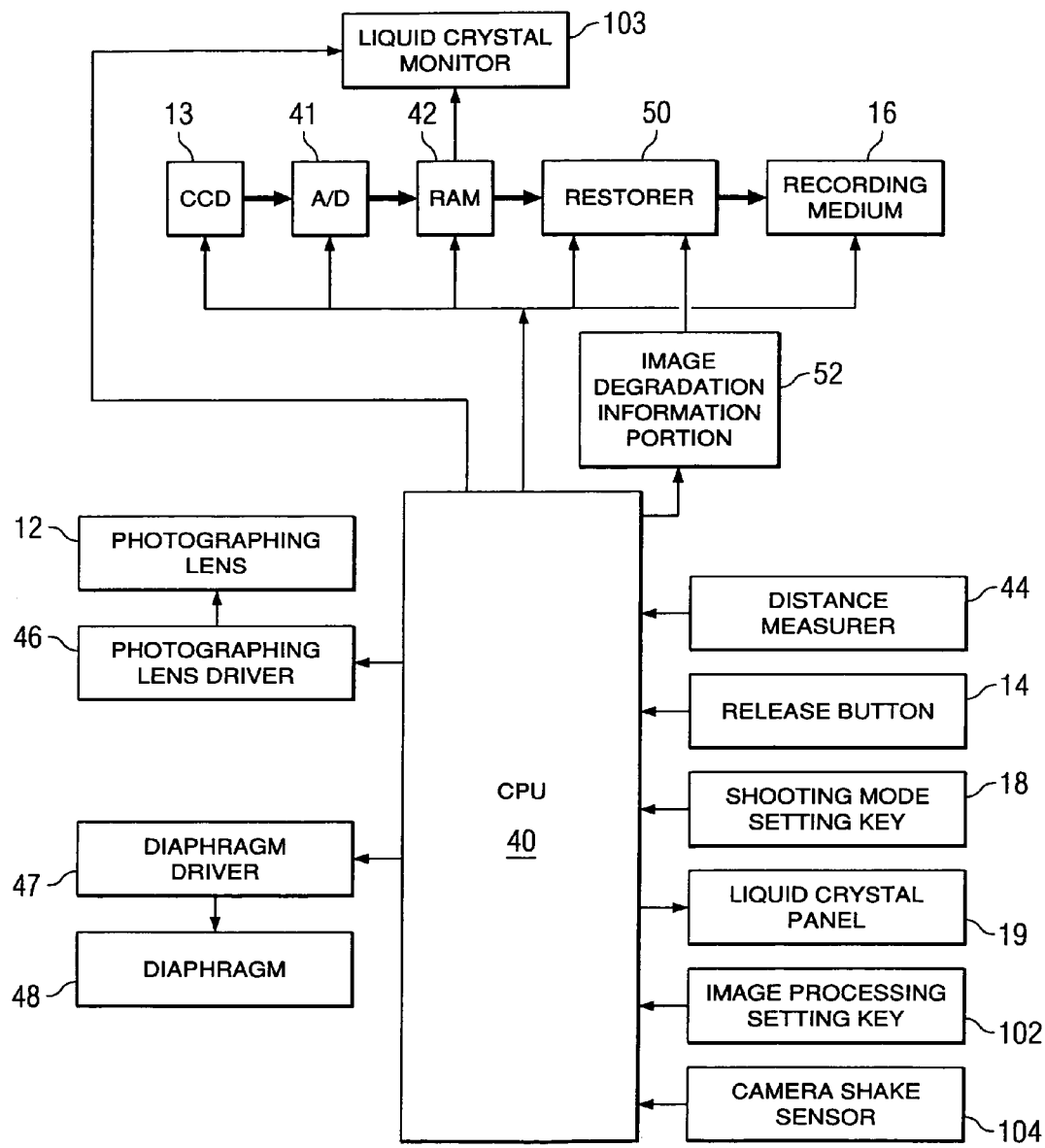
FIG. 3 is a block diagram showing the electric structure of the digital camera shown in FIG. 1.

FIG. 3 is a block diagram of the digital camera 10. The thin arrows show the flow of control data. The thick arrows show the flow of image data.

Reference number 40 represents a CPU that stores the shooting condition when the shutter button 14 is depressed and the setting condition of the image processing setting keys 102, and displays the exposure condition on the liquid crystal panel 19. Further, the CPU 40 drives the photographing lens 12 so as to be focused on an appropriate subject through a photographing lens driver 46 based on the distance measurement result from a distance measurer 44. Further, the CPU 40 controls a diaphragm 48 through a diaphragm driver 47.

The analog image signal from the CCD 13 is converted to digital image data by an A/D converter 41, and is temporarily stored in an image memory (RAM) 42. The stored image data is displayed on the liquid crystal monitor 103 by the control by the CPU 40.

Reference number 50 represents an image restorer that restores shot images. The image restorer 50 restores the image stored in the RAM 42 when it is necessary to do so. Details of the image restoration will be described later.

Figure 4:
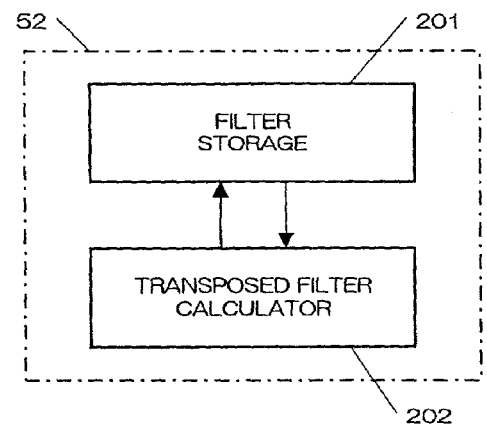
FIG. 4 is a block diagram showing the structure of an image degradation information portion in the digital camera shown in FIG. 1.

Reference numeral 52 represents an image degradation information portion that acquires image degradation information obtained from a camera shake sensor 104 or the like. As shown in FIG. 4, the image degradation information portion has a filter storage 201 in which the degrading filter obtained from the image degradation information and the transposed filter of the degrading filter are stored, and a transposed filter calculator 202 that calculates the transposed filter of the image degrading filter. The method of calculating the transposed filter will be described later.

When the image restoration is not performed, the CPU 40 records the image read from the RAM 42 onto the recording medium 16. When the image restoration is performed, the CPU 40 records the image restored by the image restorer onto the recording medium 16.

Figure 5:
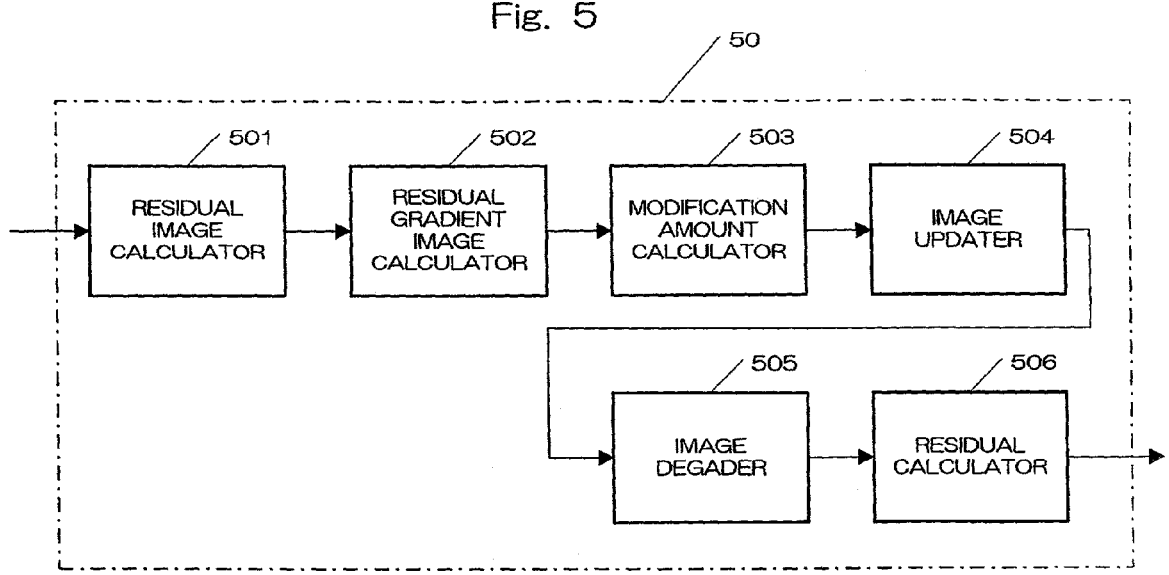
FIG. 5 is a block diagram showing the functional structure of a restorer in the digital camera shown in FIG. 1.

Functionally, the image restorer 50 has, as shown in FIG. 5, a residual image calculator 501, a residual gradient image calculator 502, a modification amount calculator 503, an image updater 504, an image degrader 505 and a residual calculator 506.

The residual image calculator 501 calculates a residual image from the image degrading filter, the estimated restored image and the degraded image. The residual gradient image calculator 502 calculates a residual gradient image by use of the convolution operation of the transposed filter and the residual image. The modification amount calculator 503 calculates the image modification amount by use of the residual gradient image. The image updater 504 modifies and updates the estimated image by use of the modification amount. The image degrader 505 degrades the image updated by the image updater 504 by use of the degradation function obtained at the time of shooting. The residual calculator 506 calculates the residual between the degraded image and the shot image.

The CPU 40 determines whether the residual calculated by the residual calculator 506 is smaller than a predetermined threshold value or not. When the residual is not smaller than the threshold value, the CPU 40 supplies the updated image (estimated image) to the residual image calculator 501 as a new image to be processed, and iterates the image modification and update by the residual gradient image calculator 502, the modification amount calculator 503 and the image updater 504, the image degradation by the image degrader 505 and the residual calculation by the residual calculator 506 until the residual is smaller than the predetermined threshold value. When the residual is smaller than the predetermined threshold value, the corresponding updated image (estimated image) is recorded onto the recording medium 16 as the restored image.

Shooting and restoration by the digital camera 10 are performed in the following manner: First, the user selects aperture priority, shutter priority or the like with the shooting mode setting keys 18. Finishing the setting of the camera, the user recognizes a subject and depresses the release button 14. Then, the distance measurer 44 measures the subject distance. Then, based on the result of the distance measurement, the photographing lens 12 is driven so as to be focused on the subject through the photographing lens driver 46. Then, the diaphragm 48 is set at an appropriate value through the diaphragm driver 47. Then, charge accumulation by the CCD 13 is started, and the image data is read out. The read image data is converted to digital data by the A/D converter 41 by a pipeline method, and is temporarily stored in the RAM 42.

The image degradation information obtained from the camera shake sensor 104 is stored in the filter storage 201 of the image degradation information portion 52.

Then, the image restoration is performed by the image restorer 50 by use of the shot image stored in the RAM 42.

Figure 6:
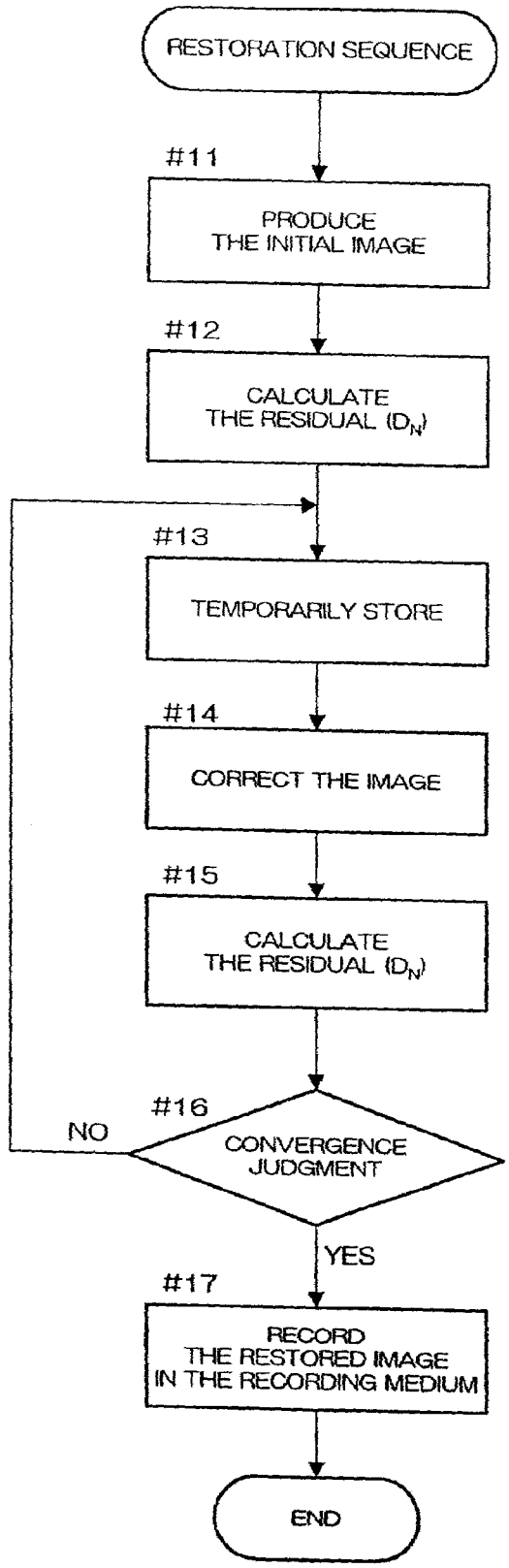
FIG. 6 is a flowchart of the image restoration of the digital camera shown in FIG. 1.

The contents of the restoration are shown in the flowchart of FIG. 6. In the description that follows and the figure, steps are represented by #.

First, at #11, the image restorer 50 produces a pre-degradation image (hereinafter, referred to as initial image) necessary for the image restoration from the shot image stored in the RAM 42 (hereinafter, sometimes referred to as picked image). To produce the initial image, for example, a method performing edge enhancement filtering is adopted when deterioration of a sharp edge such as a blur is caused. Alternatively, the obtained image may be used as the initial image as it is without any processing performed.

After the initial image is produced, at #12, the initial image $X_0(i,j)$ is degraded by use of the degrading filter h obtained at the time of shooting and stored in the filter storage 201, and the difference (residual $D_0$) from the picked image $Y(i,j)$ is calculated by the following expression (3):

$$D_0 = \sum_{i=1}^{M} \sum_{j=1}^{N} |Y(i, j) - h * X_0(i, j)|^2 \quad (3)$$

where i and j are natural numbers, M is the number of pixels in the vertical direction, and N is the number of pixels in the horizontal direction. In the expression (3), $h*X_0(i, j)$ represents the convolution operation of the degrading filter h and initial image $X_0(i,j)$.

Then, at #13, the initial image $X_0(i,j)$ is temporarily stored in the RAM 42.

After the residual is calculated, at #14, an image modification is made from the initial image $X_0(i,j)$ temporarily stored in the RAM 42, the degrading filter h obtained at the time of shooting and the picked image $Y(i,j)$, and the initial image $X_0(i,j)$ is updated to produce a new image (updated image) $X_1(i,j)$.

Then, at #15, a residual $D_1$ is calculated from the updated image $X_1(i,j)$, the degrading filter h and the picked image $Y(i,j)$ by the following expression (4):

$$D_n = \sum_{i=1}^{M} \sum_{j=1}^{N} |Y(i, j) - h * X_n(i, j)|^2 \quad (4)$$

where n is the number of iterations (n=1, 2, . . . ), i and j are natural numbers, M is the number of pixels in the vertical direction, and N is the number of pixels in the horizontal direction.

After the residual $D_1$ is calculated, at #16, whether the relationship of the following expression (5) holds or not, that is, whether the residual $D_1$ is converged or not is determined:

$$D_n < K \quad (5)$$

where K is a sufficiently small constant.

When the residual $D_1$ is not converged (the result of the determination of #16 is NO), the process returns to #13 to perform the second iterative calculation, and the initial image $X_0(i,j)$ temporarily stored in the RAM 42 is deleted and the new updated image $X_1(i,j)$ is temporarily stored in the RAM 42. An image modification is made from the updated image $X_1(i,j)$ temporarily stored in the RAM 42, the degrading filter h obtained at the time of shooting and the picked image $Y(i,j)$, and the updated image $X_1(i,j)$ is updated to produce a new updated image $X_2(i,j)$ (#14).

Similarly to the aforementioned, a residual $D_2$ is calculated from the updated image $X_2(i,j)$, the degrading filter h and the picked image $Y(i,j)$ by use of the expression (4) (#15). Then, whether the calculated residual $D_2$ is converged or not is determined from the relationship of the expression (5) (#16). When the residual $D_2$ is not converged, the process again returns to #13 to iterate similar procedures.

When the residual is converged (the result of the determination of #16 is YES), at #17, the updated image $X_{n-1}(i,j)$ stored in the RAM 42 is used as the restored image, and the process returns.

Figures 7, 8:
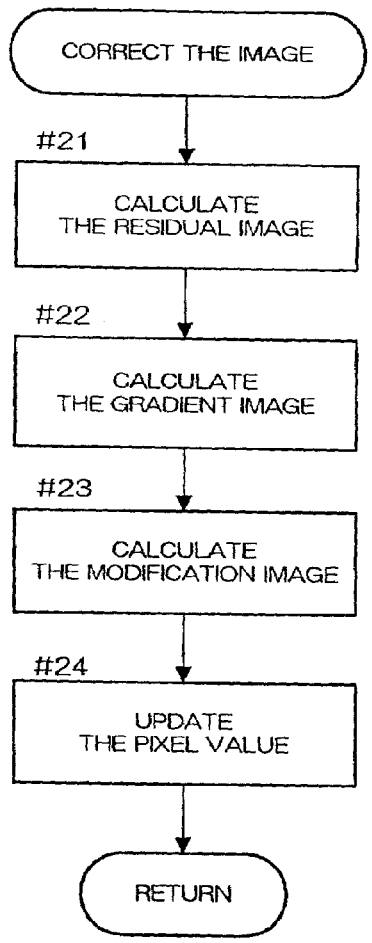
FIG. 7 is a flowchart showing a subroutine of the image restoration.
FIG. 8 shows an original image area.

The subroutine of the image restoration (#14) is shown in FIG. 7.

In FIG. 7, at #21, a residual image $R(i,j)$ is calculated by the following expression (6) by use of the current updated image $X_n(i,j)$, the degrading filter h stored in the filter storage 201 and the picked image $Y(i,j)$:

$$R(i, j) = (X_n * h - Y)(i, j) \quad (6)$$

Then, at #22, a gradient image $G(i,j)$ is calculated by the following expression (7) by the convolution operation of the residual image $R(i,j)$ and a transposed filter $h^t$ stored in the filter storage 201:

$$G(i, j) = (R * h^t)(i, j) \quad (7)$$

At this time, with respect to the transposed filter to perform the convolution operation, a transposed filter of a different configuration is used for a boundary part (edge part) of the degraded image. By using a different transposed filter for a boundary part of the image as mentioned above, noise such as ringing caused, for example, in the vicinity of the edge of the restored image is suppressed.

Now, an example will be described in which an original image of 7×7 shown in FIG. 8 is degraded by a degrading filter of 3×3 shown in FIG. 11 into a picked image of 5×5 shown in FIG. 9. In the filters of FIGS. 11 and 12(A) to 12(C), A to I represent filter coefficients.

For example, for the filled filter area of FIG. 10, a transposed filter A shown in FIG. 12(A) is used. For the pixel at Y1 of FIG. 9, a transposed filter B shown in FIG. 12(B) is used, and for the pixel at X1 of FIG. 8, a transposed filter C shown in FIG. 12(C) is used. That is, of the positions X1 to X49 of the original image area of FIG. 8, the part rendered outside the degraded area (from Y1 to Y25) of FIG. 9 as a result of the convolution operation of the transposed filter A is zero.

When the part outside the degraded area is made zero by the transposed filter A, the image in the non-restored area is never adversely affected.

Then, at #23, a modified image is calculated by use of the gradient image $G(i,j)$ obtained at #22.

The modified image represents the updated value of each pixel for the current updated image, and various calculation methods are considered according to the adopted algorithm. As an example, when it is assumed that the original image is smooth except in the vicinity of the edge, a modified image D(i,j) is calculated by use of the steepest-descent method by expressions (8) shown below.

$$D(i, j) = k(\beta \Delta^* (V \cdot (\Delta^* X_n)) + G)(i, j) \quad (8)$$

Here, k is the step size and k is calculated by expressions (9) shown below.

$$k = -\frac{\|\beta \Delta * (V \cdot (\Delta * X_n)) + G\|^2}{\beta \|\Delta X_n\|_V^2 + \|H X_n\|^2} \quad (9)$$

Here, $\| \|^2$ is the square sum of the values of the pixels of the image, $\| \|_V^2$ is the square sum weighted by V, V is a weighting image representative of the requested degree of smoothness, $\Delta$ is a two-time partial differential operator called a Laplacian filter, and $\beta$ is a parameter representative of the degree of smoothness and is set, for example, to 0.1.

When the modified image is decided, at #24, the modified image D(i,j) is added to the current updated image, in order words, the current estimated restored image Xn(i,j) into a new updated image Xn+1(i,j). That is, Xn+1(i,j)=Xn(i,j)+D(i,j).

By thus performing the iterative calculation by use of the modified updated image, an image degraded due to a camera shake or the like can be restored. Further, since the calculation is replaced by the filter operation, even when the degradation function is one that can be expressed as a complicated helical filter, the memory consumption is small and the calculation time is significantly short compared to a method performing the calculation in consideration of a large matrix and an inverse matrix.

In the transposed filter calculator 202, the transposed filter is calculated in the following manner.

The original image shown in FIG. 8 is as shown in FIG. 15 when converted to a column vector.

The degrading filter h shown in FIG. 11 is a block tridiagonal matrix H as shown in FIG. 13 when converted to a matrix. The blocks A, B and C themselves are tridiagonal matrices, and have a nested configuration.

Therefore, calculating the transposed matrix $H^T$ of the block tridiagonal matrix H, a transposed matrix as shown in FIG. 14 is obtained. The transposed filter configurations as shown in FIGS. 12(A) to 12(C) are accurately obtained from the configuration of the transposed filter $H^T$.

While the image restoration is performed by the digital camera 10 in the description given above, an image shot by a digital camera or the like may be restored by an external apparatus such as a computer. In this case, the program of FIGS. 6 and 7 is read into a computer through a network or a recording medium, and is executed on the computer.

As described above, according to the present invention, the transposed filter of the image degrading filter is calculated, and the residual gradient image is obtained by the convolution operation of the transposed filter and the residual image obtained from the image degrading filter, the estimated restored image and the degraded image. Then, the estimated image is modified and updated based on the modification amount of the estimated image calculated by use of the residual gradient image, and by use of the updated image, the image is restored by the iteration method. Consequently, restoration of an image degraded, for example, by a camera shake of a digital camera can be realized. Further, since the calculation is replaced by the filter operation, even when the degradation function is one that can be expressed as a complicated helical filter, the memory consumption can be reduced and the calculation time for the restoration can be shortened.

Although the present invention has been fully described by way of examples with reference to the accompanying drawings, it is to be noted that various change and such changes and modifications depart from the scope of the present invention, they should be construed as being including therein.

What is claimed is:

1. An image restoration apparatus comprising:
   a first image generator for generating a first image;
   a detector for detecting a degradation information of the first image;
   a filter generator for generating a degrading filter and a transposed filter of the degrading filter based on the detected degradation information;
   a second image generator for generating a second image by use of the first image and the degrading filter;
   a residual image calculator for calculating a residual image from the first image, the degrading filter and the second image;
   a gradient image calculator for calculating a gradient image of the residual image by a convolution operation of the transposed filter and the residual image; and
   a corrector for correcting the second image by use of the gradient image calculated by the gradient image calculator.

2. The image restoration apparatus according to claim 1, wherein said first image generator is an image sensing device.

3. The image restoration apparatus according to claim 2, wherein said image restoration apparatus is a digital camera.

4. The image restoration apparatus according to claim 1, further comprising a camera shake sensor, and wherein said detector detects the degradation information of the first image based on the output from said camera shake sensor.

5. The image restoration apparatus according to claim 1, wherein said gradient image calculator uses a plurality of the transposed filters.

6. The image restoration apparatus according to claim 5, wherein said gradient image calculator uses a transposed filter which a part outside of the degraded area of the first image is zero.

7. The image restoration apparatus according to claim 1, further comprising:
   a residual calculator for calculating a residual between the corrected second image and the first image;
   a discriminator for discriminating the calculated residual is smaller than a predetermined threshold value or not; and
   a recorder for recording the corrected second image as a restored image onto a recording medium when the residual is smaller than the predetermined threshold value.

8. A program embodied in a computer readable medium for executing an image restoring, in which execution of said program by a computer allows said computer to execute the steps of:
   generating a first image;
   detecting a degradation information of the first image;

generating a degrading filter and a transposed filter of the degrading filter based on the detected degradation information;

generating a second image by use of the first image and the degrading filter;

calculating a residual image from the first image, the degrading filter and the second image;

calculating a gradient image of the residual image by a convolution operation of the transposed filter and the residual image; and correcting the second image by use of the gradient image.

\* \* \* \* \*